Aug. 9, 1949.  J. H. CORNWALL  2,478,745
PHOTOMETER

Filed Feb. 4, 1947  2 Sheets-Sheet 1

INVENTOR
John H. Cornwall
BY
Pennie, Edmonds, Morton & Barrows.
ATTORNEYS

Aug. 9, 1949.                J. H. CORNWALL                 2,478,745
                                PHOTOMETER
Filed Feb. 4, 1947                                      2 Sheets-Sheet 2
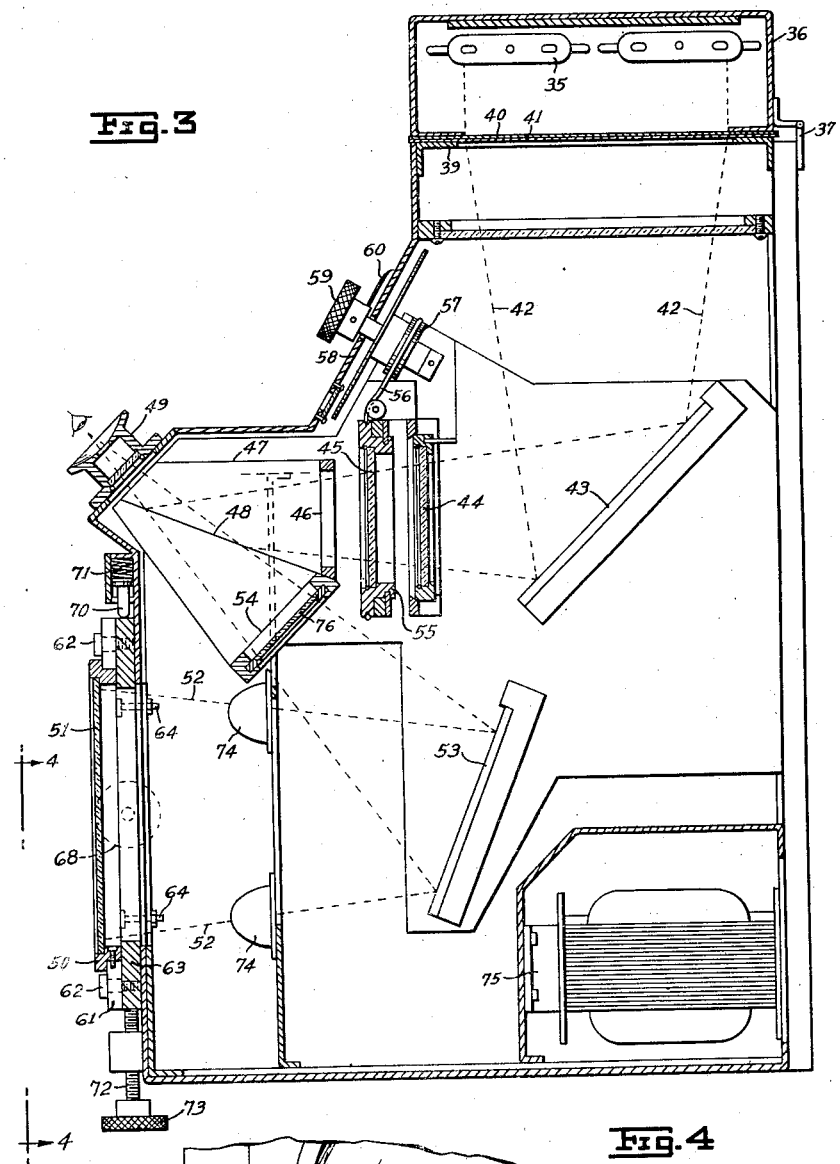
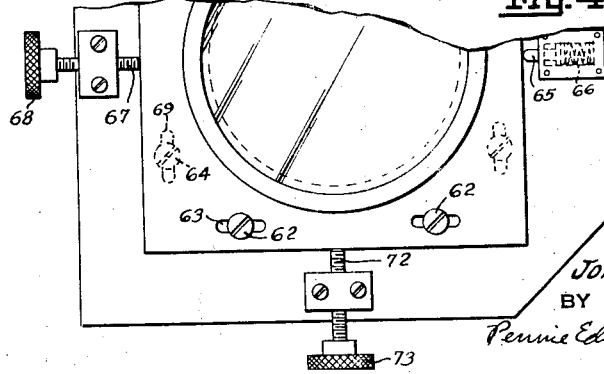
INVENTOR
John H. Cornwall
BY
Pennie Edmonds, Morton & Barrows
ATTORNEYS Patented Aug. 9, 1949

2,478,745

UNITED STATES PATENT OFFICE 2,478,745

PHOTOMETER

John H. Cornwall, North Creek, N. Y., assignor to United States Radium Corporation, New York, N. Y., a corporation of Delaware Application February 4, 1947, Serial No. 726,291

15 Claims. (Cl. 250—71)

This invention relates to photometers, and is particularly concerned with the provision of an improved photometer suitable for measuring the brightness of luminescent phosphors, especially when applied in the form of numerals, fine markings, or other small areas.

The new photometer comprises a standard phosphor which can be made to glow with standard brightness, a mount for a test phosphor whose luminosity is to be measured in terms of the standard phosphor, and a viewing station where images of both phosphors are viewed in juxtaposition. An adjustable light-stop means, such as a pair of polarizing filters, is mounted in the path of light passing from the standard phosphor to the viewing station, and control means are provided for adjusting the light-transmitting ability of the light-stop means (e. g. for rotating one of the polarizing filters relative to the other if polarizing filters are used as the adjustable light-stop means), so that the brightness of the image of the standard, as viewed at the viewing station, may be made to match the brightness of the image of the test phosphor, as viewed at the viewing station. The angular position of the polarizing filters relative to each other when such a match is obtained provides an indication of the brightness of the test phosphor in terms of the standard.

Many different designs for photometers have been proposed in the past, but heretofore no photometer has been devised which is capable of satisfactorily measuring the brightness of luminous phosphors, when applied in the form of numerals or fine markings such as are employed to render the indicia on watch, meter and other instrument dials visible in the dark. One reason for this is that each of these small indicia is applied to the dial as a viscous paint which dries in the form of a shaped lump or area of luminscent phosphor considerably thicker at the center than at the edges thereof, and this variation in thickness of such phosphor, especially if of the self-luminous type, produces a difference in brightness of as much as 300 per cent, or more, between the center and edge portions of any one area. Furthermore, because of the mentioned variation in thickness, the thickest portion of the area is nearer to the eye-piece of the photometer than are the thinner portions, which tends to increase the apparent brightness difference between portions of the same area. Also, the irregular and unsymmetrical configuration of many indicia cause such areas to assume apparently varying brightnesses. Prior photometers lack any means by which these small areas of varying brightnesses can be integrated and hence there is no particular or effective brightness available to compare with the "standard field." Consequently it has heretofore been impossible to make a reliable brightness measurement of an instrument dial of the type described. In consequence it has not been possible to establish brightness standards for such applied phosphors, and in the absence of such standards, dials and other illuminated articles, although treated with phosphors apparently of the same luminosity when measured in the powdered form, have, as a practical matter, differed widely in luminosity. To a lesser extent it is true that even the same batch of a luminous phosphor composition, when applied by different operators, usually differs in brightness owing to differences in final thickness. The manufacturers and users of such products have heretofore lacked satisfactory standards and satisfactory means for measuring the brightness of the phosphors when thus applied to instrument dials or other devices.

The measurement of the relative brightness of two areas can be made with considerable accuracy only if such areas can be arranged in exact juxtaposition, viz., with no space between adjacent edges of the two illuminated areas. In addition to the foregoing, another reason that prior photometers have not been adapted to measure the brightness of applied luminescent phosphor compositions is that the area of the phosphor to be measured is so small, or of such irregular shape, that it cannot be accommodated in the field of the photometer, causing blank areas or unilluminated spaces to exist between the two illuminated areas. The photometer according to the present invention provides means by which the edges of all of the areas to be measured can be arranged to appear immediately adjacent the edges of the standard area against which the brightness is to be compared, there being no unilluminated or blank areas intervening, regardless of the size and configuration of the illuminated areas to be measured. In other words, the areas to be measured, whatever their size and shape, exactly "fit" the field.

Secondly, prior photometers have not been adapted to determine the average or effective brightness of a treated surface composed of a series of separated illuminated areas of an applied luminous phosphor composition such as on a clock or watch dial, because the luminosity of many such compositions is inherently low and may vary somewhat in intensity from one illuminated area to another, as well as from one portion to another of the same area. The photometer according to the present invention serves as an integrating instrument and for the first time makes possible the determination of average or effective brightness with relatively high accuracy.

Thirdly, prior photometers have not been adapted to measure the brightness of applied luminous phosphor compounds in general, because such compounds emit light in a wide variety of colors. This requires the selection of color filters suitable to match the color of the phosphor under test to the color of the light standard employed in calibrating the photometer. Such selection is difficult and frequently leads to large errors in measurement. In my new photometer the standard phosphor may be composed of the same luminescent material of which the test phosphor is composed so that both the standard and the test specimen will glow with light of the same color characteristics. This greatly facilitates photometric comparison of the standard and the specimen to be measured because it obviates the otherwise difficult determination and use of an exactly correct color filter. If, in accordance with this invention, the luminescent material employed for the test specimen and for the standard specimen be taken from the same batch, and employed under such conditions that the brightness of one of the specimens is greater than that of the other, the brighter specimen can, further in accordance with the invention, be caused effectively to glow with any desired predetermined degree of brightness, and without the need for considering any possible differences or changes in color values.

Basically, the new photometer comprises a standard phosphor and means for making the standard phosphor glow with standard brightness over a substantial area when the luminescence of a test phosphor specimen is to be determined. Means are provided for directing light from the standard phosphor to a viewing station, and suitable means also are provided for directing light from the test phosphor to the viewing station, so that at the viewing station the image of the test phosphor is viewed in juxtaposition with the image of the standard phosphor. A pair of polarizing filters (or other adjustable light-stop means) is mounted in the path of the light passing from the standard phosphor to the viewing station, and suitable control means serve for angularly moving at least one of these filters relative to the other. By manipulation of the control means, the brightness of the image of the standard phosphor, as seen at the viewing station, can be made to match the brightness of the juxtaposed image of the test phosphor, as seen at the viewing station. Indicating means associated with the control means are provided to indicate the brightness of the test phosphor relative to the brightness of the standard phosphor when such match it attained.

The new photometer is particularly well adapted for use in measuring the brightness of luminous indicia on clock and other instrument dials. For such use, masking means are provided for blocking light from regions of the standard phosphor which correspond to the luminous indicia on the dial being measured. The dial in such case is mounted so that the image seen at the viewing station of the dial indicia registers with the dark areas, produced by the masking means, in the image seen at the viewing station of the standard phosphor. The control means which operate to adjust the angular position of the polarizing filters relative to each other then may be manipulated until the brightness of the dial indicia image just matches the brightness of the standard phosphor image, as both images are seen in juxtaposition at the viewing station. When such match is attained, a plain luminous field on which the dial indicia are not visible either as light or dark areas is observed. Such match is sharp and can be determined with a high degree of accuracy even by persons insufficiently skilled to use prior photometers, and when it is attained, the brightness of the dial indicia in terms of the brightness of the standard phosphor may be ascertained from the indicating means associated with the control knob.

The new photometer is described in greater detail below with reference to the accompanying drawing, in which Figs. 1 and 2 are side and bottom views, respectively, of one form of photometer made in accordance with the invention;

Fig. 3 is an elevation of a modified form of photometer; and

Fig. 4 is a front view of a portion of the test specimen mount of the modified photometer taken substantially as indicated by the line 4—4 of Fig. 3.

Figure 1:
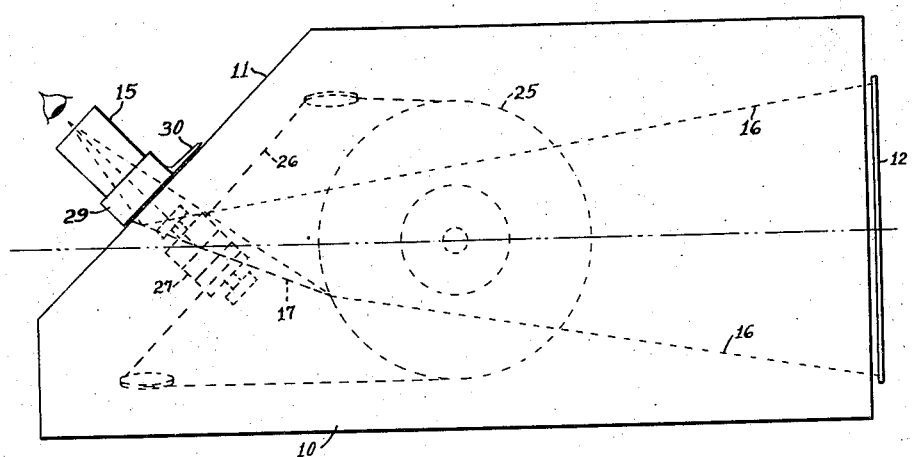
Figure 2:
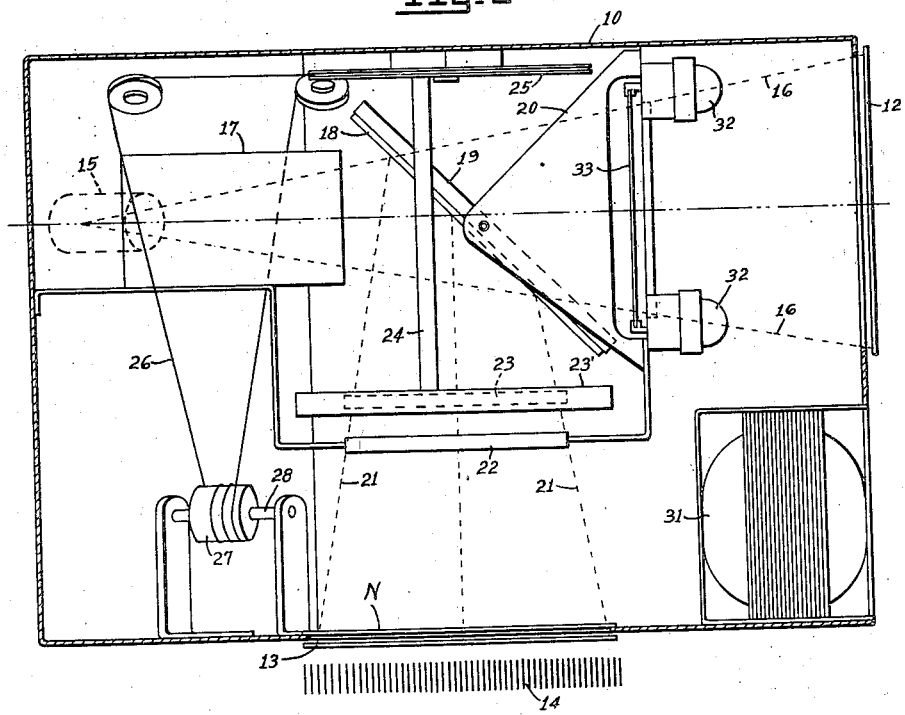

The photometer shown in Figs. 1 and 2 comprises a cabinet 10 having a sloping front 11. A mounting fixture 12 for holding a test phosphor whose luminosity is to be determined is arranged at the back of the cabinet. A standard phosphor 13 is mounted at one side of the cabinet. The standard phosphor may comprise a thin plate of glass on which the phosphor is coated. The standard phosphor is caused to glow with standard brightness when energized by activating means shown schematically at 14. Such activating means may be either an ultraviolet or other suitable light source. A source of alpha radiation may be employed, although a light source is preferred.

A viewing station in the form of an eye-piece 15 is mounted on the sloping front of the cabinet. The viewing station eye-piece is so located as to be substantially in line with the test phosphor mount 12. The path of light from the test phosphor to the viewing station lies within the cone defined by the lines 16. Just before reaching the viewing station, the light is reflected from a silvered mirror 17 upwardly at an angle such that it enters and traverses the eye-piece axially.

Interposed in the path of the light passing from the specimen in the mount 12 to the viewing station is a transparent mirror 18. Advantageously a pellicle mirror supported in a suitable frame 19 secured to one or more brackets 20 is employed. The mirror 18 also lies in the path of light (within the cone defined by the lines 21) from the standard phosphor 13, and is arranged at the proper angle to reflect light from the standard phosphor to the silvered mirror 17 and thence to and through the viewing station eye-piece 15. Thus the eye-piece receives light both from the standard phosphor 13 and from the specimen phosphor in the mount 12. By blocking light from a portion of the standard phosphor, and also from an inversely corresponding or complementary portion of the test specimen, the images of the standard and test phosphors as seen in the eye-piece will be in juxtaposition.

If the test specimen is an instrument dial bearing luminous indicia on its face, the luminous image of these indicia will be visible in the eye-piece on a dark background when the standard phosphor 13 is not illuminated. If now the standard phosphor 13 is caused to glow, and a photographic negative N of the specimen dial is suitably positioned over the standard prosphor, then the light from the test phosphor, where it is not blocked by the opaque regions of the negative N, will also produce a luminous image in the eye-piece. By properly positioning the negative N so that the configurations of the areas of light blocked or masked from the luminous standard by the opaque regions on the negative correspond to and register with the configurations of the luminous indicia on the dial in the specimen holder 12, the image of the standard as seen in the eye-piece will form a luminous field on which a luminous image of the indicia appears, but on which the effective brightness of the luminous indicia image differs from the brightness of the luminous background by an amount which is determined by the difference between the brightness of the standard phosphor 13 and the effective brightness of the indicia on the dial in the mount 12.

In order to obtain a quantitative measure of this difference in brightness, two polarizing filters 22 and 23 are mounted in the path of light within the cone 21 from the standard phosphor 13. These filters should have non-selective or neutral absorption characteristics, viz., no one wave length of light should be absorbed substantially more than any other within the effective spectrum. One of these filters 22 is permanently mounted in place, and the other filter 23 is mounted in a rotatable frame 23' rotated by a rim drive through a rotatable shaft 24 which, in turn, is driven by a pulley 25, so that the filter 23 may be rotated angularly relative to the other filter 22 through an arc of about 90°. Thus the filter 23 may be rotated to any angular position between that at which it permits passage of all of the light transmitted through the filter 22, and the position 90° therefrom at which substantially all of the light transmitted through the first filter 22 is blocked by the second filter 23.

In place of the polarizing filters, some other brightness-varying filter means for adjusting the amount of light passing from the standard to the eye-piece, such as an adjustable light stop, may be used if desired. Such a stop should, of course, be so placed in the path of light from the standard phosphor to the viewing station that it limits the amount of light transmitted without reducing the field of the standard phosphor image. It may be an adjustable iris stop such as is commonly used on photographic cameras.

When the luminous indicia on a specimen in the mount 12 are of less intrinsic brightness than the luminous standard phosphor 13, and when the planes of polarization of the two filters 22 and 23 are parallel, then the composite image seen in the eye-piece 15 comprises a luminous background (due to the luminous standard 13) and somewhat less luminous dial indicia (due to the luminous indicia on the specimen dial). By now rotating the filter 23 to the proper angular position relative to the other filter 22, the brightness of the image of the standard phosphor, as viewed in the eye-piece, may be reduced to match the brightness of the image of the dial indicia. When this match is attained, the composite image seen in the eye-piece is a field of uniform brightness, and no indicia are visible thereon either as brighter or darker areas. If the filter 23 is rotated beyond the particular angular position at which this match of brightness is obtained, then the indicia will be visible in the eye-piece as relatively bright luminous areas on a relatively dark luminous field. The point at which the match in brightness is attained is sharp and readily found by an observer with normal eyesight, and so can be determined with a high degree of accuracy.

Rotation of the filter 23 is conveniently effected by a cable 26 connecting the pulley 25 to a drum 27 mounted at the sloping front 11 of the photometer cabinet. The shaft 28 on which the drum is carried projects through the cabinet front and carries a control knob 29. By turning the control knob to the right or the left, the filter 23 may be rotated in one direction or the other, and thus the brightness of the image of the standard phosphor 13, which forms the background field seen in the eye-piece 15, may be varied as desired. An index pointer 30 on the control knob may traverse a scale engraved or otherwise marked on the cabinet front 11 about the knob 29. The point on the scale indicated by the index pointer 30 at any given setting of the knob 29 actually indicates the angular position of the rotatable polarizing filter 23 relative to the fixed filter 22, but the scale may be calibrated in terms of the brightness of the image of the standard 13 as seen in the eye-piece when the dial is at the given setting. With the scale thus calibrated, it is only necessary to manipulate the knob, when the phosphor 13 is glowing and the dial to be measured is in position in its mount 12, until the luminosity of the background field seen in the eye-piece matches the luminosity of the indicia as seen therein. The luminosity of the dial indicia is then read directly from the point on the scale indicated by the index pointer 30.

In order to secure an extended and easily read scale for a full 360° about the control knob 29, the drum 27 is made enough smaller than the pulley 25 so that the knob 29 must be rotated substantially 360° in order to effect rotation of the filter 23 through 90°.

If the activating means 14 which serves to energize the standard phosphor 13 is a light source, such as of ultra-violet light, it may be supplied with electric power from a transformer 31 mounted within the photometer cabinet, thereby making for a self-contained unit. A switch (not shown) may be mounted at the sloping front 11 of the cabinet (or elsewhere) so as to shut off the activating light source when the photometer is not in use, and thereby prevent such degeneration of the standard phosphor 13 as may occur under certain conditions when the phosphor is activated. Also, it is usually desirable to connect a rheostat or other suitable current-control device in series with the activating lamp 14 in order to control the radiations thereof and thus the brightness of the standard in the event that the brightness of the phosphor under test is less than that of the standard.

If the phosphor to be measured on the test specimen is not self-luminous, ultra-violet or other suitable light sources 32, which may also be energized from the transformer 31, may be provided to activate the test phosphor. The sources 32 should be positioned outside the cone 16 which defines the path of the light from the specimen phosphor to the eye-piece, so that these sources do not obstruct the view of the specimen phosphor in the eye-piece 15.

The photometer as described above is suited only to measuring the brightness of a phosphor whose luminosity is less than that of the standard phosphor. If the test phosphor is brighter than the standard, the image of the test phosphor will always appear brighter than the background image of the standard, regardless of the angular position of the rotatable polarizing filter 23. In order to measure the brightness of a phosphor that has a higher intrinsic brightness than the standard phosphor, a neutral light-absorbing filter 33, capable of absorbing a known amount or proportion of the light incident upon it, may be interposed in the path of light from the specimen in the holder 12 to the eye-piece. If this filter is so chosen that the brightness of the image formed by light passing through it, as seen in the viewing station eye-piece, is less than the brightness of the image of the standard phosphor, it is then possible to match the brightness of the test phosphor image with the brightness of the standard phosphor image. The luminosity of the test specimen then may be determined from the setting of the control knob 29 when such match is attained, taken in conjunction with the known light-absorbing characteristics of the filter 33 used in making the determination.

In place of the filter 33, a fixed-size or adjustable light stop may be interposed in the path of light from the test phosphor to the viewing station. Such a stop should be positioned so that it limits the amount of light transmitted through it without restricting the field of the test phosphor image.

The modified photometer shown in Fig. 3 operates in basically the same fashion as the photometer described above, but is of more compact design and is perhaps more convenient to use. The modified photometer is housed in a suitably shaped cabinet at the top of which a source 35 of ultra-violet light is mounted in a lamp housing 36 connected by hinges 37 to the back of the cabinet. A phosphor table 39 positioned directly below the housing 36 provides support for a standard phosphor element 40 and a photographic negative or other mask 41 which may be employed to block the light emitted from certain areas of the standard phosphor 40. When the lamp housing 36 is swung down into its operating position, as shown in the drawing, the standard phosphor element 40 and the negative 41 are held by the lamp housing firmly against the supporting table 39. When the lamp housing is swung up on its hinged mount, the phosphor element or the mask, or both, may be removed or replaced. The standard phosphor element itself may consist of a plate of glass having a phosphor coating applied thereto. If desired, an ultra-violet-transmitting filter (not shown) may be interposed between the ultra-violet light sources 35 and the phosphor element 40, to screen out any visible radiation emitted by the source 35 while permitting the ultra-violet radiation to pass. This filter may be polarized to control the intensity of the activating light and hence the intensity of the standard, or means to control the current to the lamps 35 may be employed.

In place of using an ultra-violet light source to make the phosphor standard glow, a source of alpha radiation may be used for this purpose, although, as above mentioned, a light source of a nature which minimizes deterioration of the phosphor, is preferable.

The cone of visible light passing from the standard phosphor 40 along the path lying within the bounds defined by the dotted lines 42, is reflected from a silvered mirror 43 through a pair of polarizing filters 44 and 45 to a light-receiving face 46 of a special prism 47. The prism advantageously comprises two prism segments joined together along an interfacial surface 48, and this surface provides for reflecting light entering the prism face 46 upwardly and axially through a viewing station eye-piece 49. Thus an observer looking through the eye-piece sees an image of the standard 40.

A specimen holder 50 is mounted at the front of the photometer cabinet just below the eye-piece. The specimen holder is designed to receive a phosphor-surfaced test specimen 51, such as an instrument dial carrying luminous indicia, the luminosity of which is to be compared with that of the standard phosphor 40. Light from the test phosphor 51 within the cone defined by the lines 52 is reflected from a silvered mirror 53 to a second light-receiving face 54 on the prism 47. Light entering this face of the prism passes through the interfacial surface 48 of the prism and axially into the eye-piece 49. Thus an observer also sees in the eye-piece an image of the specimen phosphor 51.

As in the case of the photometer previously described, if the phosphor specimen 51 is an instrument dial and the mask 41 is a photographic negative of this instrument dial, the image of the standard phosphor visible in the eye-piece forms a luminous background on which dark areas correspond to the dial indicia, and the image of the test specimen 51 registers with these dark areas, so that the composite image consists of a luminous background (due to the standard phosphor 40) and luminous dial indicia, which may be brighter or darker than the background (due to the luminous areas of the test specimen).

In order to match the brightness of the luminous indicia with the brightness of the luminous background, one of the polarizing filters 45 is carried in a rotatable mount 55, in which it may be rotated through an angle of 90° relative to the other polarizing filter 44. The rotatable fiber mount 55 is connected by a cable 56 to a control pulley 57 from which a shaft 58 projects through the front of the photometer cabinet. A control knob 59 mounted on the projecting shaft 58 and carrying an index pointer 60 permits the operator to rotate the control pulley 57 and thereby rotate the filter 45 in the mount 55 relative to the fixed filter 44. Thus by manipulation of the knob 59, the brightness of the image of the standard phosphor 40, as seen in the eye-piece, may be continuously varied from its full brightness value to substantially total extinction. By such manipulation of the knob 59, the operator of the photometer may vary the brightness of the image of the standard phosphor 40, as seen in the eye-piece, until it exactly matches the brightness, as seen in the eye-piece, of the image of the dial indicia or other phosphor markings on the test specimen 51. A suitably calibrated scale (not shown) engraved or otherwise marked on the photometer cabinet under the index pointer 60 then indicates the brightness of the specimen phosphor in terms of the standard phosphor 40.

As in the case of the photometer shown in Figs. 1 and 2, the control pulley 57 is enough smaller than the rotatable filter mount 55 so that substantially a full turn of the control knob 59 is required to rotate the filter 45 through 90°, so as to permit an extended scale to be engraved under the index pointer 60.

In using a photometer of the character herein described to compare the luminosity of dial indicia with that of the reference standard, it is important that the image of the dial indicia, as viewed through the eye-piece, register accurately with the dark areas in the image of the standard, which correspond to the areas from which light has been blocked by the mask 41 placed in contact with the standard phosphor. To insure securing such registry, the specimen 51 in the specimen holder 50 may be rotated angularly so that its angular position may be made to correspond with that of the mask 41. The specimen holder 50 is mounted in a laterally movable frame 61 held by screws 62 to a vertically movable carriage plate 63. Other screws 64 serve to hold the carriage plate against the front face of the photometer cabinet. The screws 62 that fasten the specimen holder frame to the carriage plate extend through slots 63 so that lateral movement of the specimen holder on the carriage plate is possible. A pin 65 urged outwardly by a compression spring 66 (Fig. 4) normally tends to press the specimen holder frame to one side, but movement of the frame in the direction in which it is urged by the spring is resisted by an adjustment screw 67 having a knurled head 68. The lateral position of the specimen holder frame may be adjusted by suitable turning of the screw 67.

The bolts 64 holding the carriage plate to the photometer cabinet also pass through slots 69 in the carriage plate so as to permit vertical movement of this plate and the specimen holder mounted therein. A pin 70, urged downwardly by a compression spring 71, normally presses the carriage plate and specimen holder toward the bottom of its limit of travel, but such motion is resisted by a second adjustment screw 72 having a knurled head 73. By turning the screw 72, the vertical position of the specimen holder may be adjusted as desired.

By virtue of the angular, lateral and vertical adjustments described, the specimen in the holder 51 may be adjusted in whatever direction is necessary to bring the image of the luminous indicia or other markings thereon into accurate registry with the image of the masked standard 40.

Ultra-violet light sources 74 may be provided and suitably located to irradiate a non-self-luminous specimen phosphor mounted in the holder 50, so as to cause such phosphor to glow with visible light when its luminosity is to be compared with that of the standard phosphor. The power to energize the ultra-violet sources 74, and also the ultra-violet source 35 that activates the standard phosphor, may be provided by a transformer 75 mounted within the photometer cabinet, and all wiring connections to these sources may be arranged within the cabinet. Switches to turn the sources 35 and 74 on and off, as desired, may also be mounted at any convenient position on the cabinet.

In order to use the photometer shown in Fig. 3 to measure the luminosity of a phosphor glowing with greater brightness than the standard phosphor, a neutral light-absorbing filter 76 may be mounted in the path of light from the specimen phosphor to the eye-piece. The neutral filter 76 should, of course, possess known light absorbing characteristics and should serve to reduce brightness of the image of the specimen phosphor to some value less than the maximum brightness of the image of the standard phosphor 40.

It is understood, of course, that a fixed or adjustable light stop may be used in place of the neutral filter 76, and similarly an iris or other adjustable stop may be employed in place of the polarizing filters 44 and 45, as described above in conjunction with the photometer shown in Figs. 1 and 2.

It will be appreciated that in the construction of a photometer as herein described, it is highly desirable for the dimensions to be such that the length of the light path from the specimen to the eye-piece is equal to the length of the light path from the standard to the eye-piece. When the light paths are equal, no special correction need be made in the photometer reading to take into account the difference in brightness of the images at the eye-piece caused by difference in the lengths of the light paths. Moreover, with equal light paths, the size of a photographic negative or other mask (41 of Fig. 3 or N of Fig. 1) may be of the same size as the specimen, and need not be enlarged or reduced in the proportion required to compensate for unequal lengths of the paths of light.

It is also evident that in using the photometer best results are obtained if the standard phosphor emits light having the same color characteristics as the test phosphor. While it is possible to make photometric measurements by comparing the brightness of images of different color characteristics, such comparison is difficult and never so certain as when the standard and specimen both emit light of the same color.

In order to insure that light reaching the eye-piece from the standard phosphor will be of the proper brightness for photometric measurements, the stationary polarizing filter (22 of Fig. 1 or 44 of Fig. 3) should be positioned so that its plane of polarization is effectively (viz., in respect to light transmission) parallel with the plane of polarization of the mirror that reflects the light from the standard to the eye-piece (the mirror 18 in the case of the apparatus shown in Fig. 1, or the silvered mirror 43 in the case of the apparatus shown in Fig. 2).

While the photometer has been particularly described with reference to its use for measuring the luminosity of luminous indicia on instrument dials, it is apparent that its use is not limited to this field. It may be employed for comparing the brightness of any phosphor pattern with a suitable luminescent standard phosphor. For example, if it is desired to measure the luminescent qualities of a phosphor specimen or luminous phosphor composition, such phosphor or composition may be applied as a semi-circular coating on a plate that may be mounted in the specimen holder, and a corresponding semi-circular area may be blocked out by a thin metal or other mask from the luminous standard phosphor, so that, as viewed in the eye-piece of the instrument, the image of the specimen is juxtaposed to the image of the standard.

I claim:

1. A photometer for measuring the effective brightness of luminous indicia on instrument dials and the like, said indicia consisting of a plurality of areas of phosphor material, each area comprising portions differing in brightness, including in combination, a standard phosphor and means for causing said standard phosphor to glow over a substantial area with standard brightness, masking means positioned to mask the light from areas of said standard phosphor corresponding in size, configuration and arrangement to the luminous indicia of the dial to be measured, the effective remaining areas of said standard phosphor being unmasked, brightness-varying filter means interposed in the light path between said standard phosphor and said viewing station, means for directing light from the unmasked areas of said standard phosphor through said filter means to form an image of said unmasked areas visible at a viewing station, means for directing light from the luminous indicia on the dial to form an image thereof visible at said viewing station, means for adjusting the position of the dial to be measured relative to the position of the masking means so that the illuminated image of the dial registers with the unilluminated areas of the image of the standard phosphor, control means for adjusting said filter means so as to adjust the brightness of the image of the standard phosphor to match the effective brightness of the image of the dial indicia, and indicating means operatively associated with said control means for indicating the effective brightness of the dial indicia relative to the brightness of the standard phosphor when said match is attained.

2. A photometer according to claim 1, wherein said masking means comprises a photographic negative of the instrument dial, said negative having opaque regions corresponding to the luminous dial indicia on an otherwise effectively transparent area.

3. In a photometer according to claim 1, in which the plane of the test phosphor is at an angle to the plane of the standard phosphor, a transparent reflecting surface interposed in the path of light from both phosphors and so arranged that light from the total effective luminous area of one phosphor is transmitted through said surface to the viewing station and light from the total effective luminous area of the other phosphor is reflected from said surface to the viewing station.

4. A photometer for measuring the effective brightness of luminous indicia on instrument dials and the like, said indicia consisting of a plurality of areas of phosphor material, each area comprising portions differing in brightness and being a small fraction of the total area of said dial, including in combination, a standard phosphor and means for causing said standard phosphor to glow over a substantial area with standard brightness, masking means positioned to mask the light from areas of said standard phosphor corresponding in size, configuration and arrangement to the luminous indicia of the dial to be measured, the effective remaining areas of said standard phosphor being unmasked, brightness-varying filter means interposed in the light path between said standard phosphor and said viewing station, a pair of polarizing filter means having neutral absorption characteristics, means for directing light from the unmasked areas of said standard phosphor through said filter means to form an image of said unmasked areas visible at a viewing station, means for directing light from the luminous indicia on the dial to form an image thereof visible at said viewing station, means for adjusting the position of the dial to be measured relative to the position of the masking means so that the illuminated image of the dial registers with the unilluminated areas of the image of the standard phosphor, control means for angularly moving one of said filters relative to the other so as to adjust the brightness of the image of the standard phosphor to match the effective brightness of the image of the dial indicia, and indicating means operatively associated with said control means for indicating the effective brightness of the dial indicia relative to the brightness of the standard phosphor when said match is attained.

5. A photometer according to claim 4 in which one of said filters is fixed and the other is angularly adjustable, a mirror mounted so that light passing from said standard phosphor through said filters to said viewing station is reflected by said mirror, and a mounting for the fixed filter which maintains the plane of polarization of the fixed filter so as to be effectively parallel with the plane of polarization of said mirror.

6. In a photometer according to claim 1, in which the average plane of the dial indicia phosphor is effectively at an angle to the plane of the standard phosphor, a prism having two angularly disposed light-receiving faces interposed one in the path of light from said indicia phosphor and the other in the path of light from the standard phosphor, and having an internal interfacial surface so positioned that light entering one light-receiving face of the prism is transmitted through said surface to the viewing station and light entering the other light-receiving face is reflected from said surface to the viewing station.

7. In a photometer according to claim 1; mounting means for the dial to be measured comprising a dial holder in which the dial may be turned angularly, a carriage plate supporting the dial holder, means for moving the dial holder longitudinally on the carriage plate, and means for moving the carriage plate with holder thereon in a direction at right angles to the direction of movement of the holder on the carriage, whereby the position of the dial may be adjusted laterally, longitudinally and angularly so as to cause light passing from the phosphor areas on said dial to the viewing station to register in juxtaposition with light from the standard phosphor.

8. In a photometer according to claim 4, mounting means for the dial to be measured comprising a dial holder in which the dial may be turned angularly, a carriage plate supporting the dial holder, means for moving the dial holder longitudinally on the carriage plate, and means for moving the carriage plate with holder thereon in a direction at right angles to the direction of movement of the holder on the carriage, whereby the position of the dial may be adjusted laterally, longitudinally and angularly so as to cause light passing from the phosphor areas on said dial to the viewing station to register in juxtaposition with light from the standard phosphor.

9. In a photometer according to claim 1, a source of ultra-violet light connected in an electric circuit and positioned to activate the standard phosphor and cause it to glow when said source is energized, and switching means interposed in said circuit for de-energizing said source when the photometer is not in use, thereby to protect the standard phosphor from such degeneration as occurs during activation thereof when the photometer is not in use.

10. In a photometer according to claim 1, a source of alpha-radiation positioned to activate the standard phosphor and cause it to glow, and means for isolating the phosphor from said alpha-radiation when the photometer is not in use, thereby to protect the standard phosphor from such degeneration as occurs during activation thereof when the photometer is not in use.

11. In a photometer according to claim 1 wherein the brightness of said standard phosphor is less than the effective brightness of the phosphor of said luminous indicia of the dial to be measured, means interposed in the path of light between the luminous indicia and said viewing station of properties effecting to a known degree a reduction of the amount of light transmitted through it, whereby the effective brightness of the image of dial indicia of greater intrinsic brightness than that of the standard phosphor may be reduced to a value that can be matched with the brightness of the image of the standard phosphor by adjustment of said control means.

12. A photometer according to claim 11, in which the means for reducing the amount of light passing from said luminous indicia to the viewing station comprises a neutral filter having known light-absorbing characteristics.

13. A photometer according to claim 11, in which the means for reducing the amount of light passing from said luminous indicia to the viewing station comprises a light stop so positioned in the path of light from said luminous indicia as to reduce the amount of light transmitted without reducing the field of the image of said indicia.

14. The method of measuring the effective brightness of luminous indicia on instrument dials and the like, said indicia consisting of a plurality of areas of phosphor material, each area comprising portions differing in brightness, which includes the following steps: causing a standard phosphor to glow over a substantial area with standard brightness, masking the light from areas of said standard phosphor corresponding in size, configuration and arrangement to the luminous indicia to be measured and leaving the effective remaining areas of said standard phosphor unmasked, forming a visible image of said unmasked areas of the standard phosphor to comprise a standard image at a viewing station, forming a visible image of said luminous indicia at said viewing station, juxtaposing said images so that the illuminated areas of the indicia image exactly fit in the masked areas of the standard image, reducing the brightness of the light forming one of said images until the effective brightnesses of both images are apparently equal, and indicating the extent to which said brightness was reduced.

15. The method of measuring the effective brightness of luminous indicia on instrument dials and the like, said indicia consisting of a plurality of areas of phosphor material, each area comprising portions differing in brightness, which includes the steps of causing an area of a standard to glow with standard brightness, integrating the areas of varying brightnesses of each of the several indicia so as to produce an effective brightness for all of said indicia by masking the light from portions of said standard area corresponding in configuration and arrangement to the configuration and arrangement of the luminous indicia to be measured, leaving other portions of said standard area unmasked, optically forming images of said luminous indicia and of said unmasked portions of the standard area, juxtaposing said images so as to comprise a substantially continuous light field, and measuring the relative effective brightness of the juxtaposed images comprising said field.

JOHN H. CORNWALL.

REFERENCES CITED

The following references are of record in the file of this patent:

UNITED STATES PATENTS

| Number | Name | Date |
| --- | --- | --- |
| 1,135,919 | Pilkington | Apr. 13, 1915 |
| 1,743,927 | Luther | Jan. 14, 1930 |
| 1,990,022 | Du Mond et al. | Feb. 5, 1935 |
| 2,051,208 | Greenwood | Aug. 18, 1936 |
| 2,246,817 | Sauer | June 24, 1941 |
| 2,344,825 | Lear | Mar. 21, 1944 |
| 2,386,806 | Ledoux | Oct. 16, 1945 |

FOREIGN PATENTS

| Number | Country | Date |
| --- | --- | --- |
| 214,670 | Germany | Feb. 12, 1909 |